United States Patent
Nair

(10) Patent No.: US 7,908,288 B2
(45) Date of Patent: Mar. 15, 2011

(54) METHOD AND SYSTEM FOR RESEARCH USING COMPUTER BASED SIMULTANEOUS COMPARISON AND CONTRASTING OF A MULTIPLICITY OF SUBJECTS HAVING SPECIFIC ATTRIBUTES WITHIN SPECIFIC CONTEXTS

(76) Inventor: Satheesh Nair, Bangalore (IN)

( * ) Notice: Subject to any disclaimer, the term of this patent is extended or adjusted under 35 U.S.C. 154(b) by 1006 days.

(21) Appl. No.: 11/734,363

(22) Filed: Apr. 12, 2007

(65) Prior Publication Data
US 2008/0256023 A1  Oct. 16, 2008

(51) Int. Cl.
*G06F 17/30* (2006.01)

(52) U.S. Cl. ........ 707/769; 707/706; 707/728; 707/736; 707/754; 707/758; 707/765; 707/760; 707/E17.014; 707/E17.069; 707/999.003

(58) Field of Classification Search .................. None
See application file for complete search history.

(56) References Cited

U.S. PATENT DOCUMENTS

| | | | |
|---|---|---|---|
| 6,873,968 B2* | 3/2005 | Ehrlich et al. | 705/26 |
| 7,107,226 B1 | 9/2006 | Cassidy et al. | |
| 7,120,595 B2 | 10/2006 | Alexander | |
| 7,490,091 B2* | 2/2009 | Lunenfeld | 1/1 |
| 2002/0111873 A1* | 8/2002 | Ehrlich et al. | 705/26 |
| 2005/0160012 A1* | 7/2005 | Schechinger et al. | 705/26 |
| 2005/0160013 A1* | 7/2005 | Schechinger et al. | 705/26 |
| 2006/0265669 A1* | 11/2006 | Lee | 715/818 |

OTHER PUBLICATIONS www.pricegrabber.com.
www.bizrate.com.
www.kayak.com.
www.shopping.com.
www.sidestep.com.
www.sonystyle.com, www.grokker.com.

* cited by examiner

*Primary Examiner* — Don Wong
*Assistant Examiner* — Andalib F Lodhi
(74) *Attorney, Agent, or Firm* — Anthony D. Pellegrini, Esquire

(57) ABSTRACT

A method and system for an internet-based online research solution through the comparison and contrasting of a potentially infinite number of subjects having defined attributes within predefined as well as dynamic subject contexts; a method and system for searching a potentially infinite number of subjects against a customized set of attribute-value configurations to arrive at an appropriate set of subjects for further research; a method and system for an online research solution by which the user efficiently researches online using a highly customized search, collation, and compilation of comparison-contrast information; a Universal Research Framework that may be embedded within any externally managed information system and which enables the above three methods to be performed within the specific system for research.

109 Claims, 4 Drawing Sheets

METHOD AND SYSTEM FOR RESEARCH USING COMPUTER BASED SIMULTANEOUS COMPARISON AND CONTRASTING OF A MULTIPLICITY OF SUBJECTS HAVING SPECIFIC ATTRIBUTES WITHIN SPECIFIC CONTEXTS

BACKGROUND OF THE INVENTION

1. Field of Invention

The present invention relates to the internet and computer network-based online information space where research across a multiplicity of subjects is conducted. More particularly, the invention relates to a method and system for research through simultaneous interactive comparison and contrasting of a multiplicity of subjects within predefined and dynamic subject contexts using a Compare-Contrast Console, a Configure-Filter-Search Console, a Custom-Research Console, and a Universal Research Framework. The method is performed using the system, and the system is embodied in computer software stored on and accessible from a computer-readable storage medium.

2. Discussion of the Related Art

Research is a methodical process of investigation aimed at discovering, interpreting, and understanding information. This intellectual investigation produces a greater knowledge of events, behaviors, theories, and laws and makes practical applications possible. Any research follows a structured process, which involves certain fundamental steps, like topic formation, hypothesis, data gathering, data analysis and conclusion. The context of the present invention is improving research during the data gathering, data analysis, and conclusion stages of the research process.

People understand subjects that are known or subjects similar to those that are known. Similar experiences reinforce the lessons of those experiences. Dissimilar experiences that contradict prior experiences tend to require new ways of thinking. Therefore, comparing and contrasting unfamiliar subjects with familiar subjects is one of the most important techniques of human learning. In a typical comparison-contrast situation, people either compare one subject to another subject, which is similar to it, or contrast it to a subject that is different from it, or most frequently, do both comparison and contrasting. Compare-Contrast is one of the important methods used in research for data analysis and conclusion.

The compare-contrast method of research, applied to a multiplicity of subjects, is conducted against specific attributes of subjects and subject contexts in order to study, simulate, understand, learn, evaluate, analyze, review, reflect, judge, oppose, conclude, and decide among the chosen subjects.

The first criterion for a comparison-contrast method is that the subjects chosen should make sense for comparison. When two subjects are being compared, one list of attributes concerning one subject cannot be compared with a completely different list of attributes concerning the second subject. The ground for comparison needs to be defined as to why the subjects are chosen for comparison and why the choice is intentional and meaningful. In addition, it is important to establish a common frame of reference for comparison, which is the context within which the two or more subjects are being compared. For example, apples and oranges can be compared against their 'nutritious value' as a frame of reference.

Currently users conducting research through comparison-contrast are predominantly using tedious offline methods, which are time consuming. There are four major steps involved in the current comparison-contrast process.

The first step of the process is to define the subjects that are to be compared and contrasted. Either the user knows which subjects to compare or the user performs a preliminary search to find the subjects to be compared within a specific subject context. Users conduct offline and online searches during this phase to identify the specific subjects for comparison within the specific subject context.

The second step involves defining the attributes for the chosen subject context. These attributes establish the frame of reference for comparison and are derived through study of the individual subjects and deducing the common attributes among the subjects, which is again mostly an offline activity.

The third step involves compiling individual values for each subject against each of the defined attributes. The subjects and the attributes form the axes of a matrix where the values for each subject-attribute pair are collated into the corresponding individual cells of the matrix. Again, this step of the process is typically conducted using offline compilation methods.

The fourth step involves analyzing the comparison-contrast research findings, deducing the similarities and differences, which again is an offline activity.

While there are some online solutions for performing research, currently there are no effective universal internet and computer network-based online solutions for simultaneously researching a multiplicity of subjects through comparison and contrast methods. Detailed information about individual subjects is available in abundance across the internet information space, mostly existing in hierarchical relationship structures. However, there are no means for the internet user to collate such available information into a common platform where it can be compared and contrasted.

The closest and most widely used related art in the comparison research domain is that found on various online shopping comparison websites. There are a number of competitive websites, which compare the shopping prices of individual items across different vendors. Websites such as http://www.pricegrabber.com, http://www.bizrate.com, http://www.kayak.com, http://www.shopping.com, and http://www.sidestep.com help users compare prices of individual items across different vendors within related products lines. Such websites also offer features for side-by-side product comparisons against product attributes. The major limitation of such related art is that these websites only compare limited products that are ready for purchase against similar products. An infinite number of other items in an infinite number of other subject areas cannot be compared and contrasted by these methods.

Another type of related art comprises the individual product company web sites such as http://www.sonystyle.com. These types of website enable the user to configure product requirements to dynamically narrow search results. The major limitation of such related art is that users can compare only a single manufacturer's products, and again an infinite number of other items in an infinite number of other subject areas are ignored.

Another related art specific to making research easier for the user is found on the Grokker website, http://www.grokker.com. This art uses a federated search strategy to access multiple databases with a single query. The topically organized list of search results makes research much easier and the mind map-based visual representation of available information helps the user reach the search results quickly. This related art, however, does not enable users to conduct research simultaneously on multiple subjects through comparison and contrast methods. In addition, it has the limitation of a fixed list of subject topics based on a search database, and users do not have the flexibility to add attributes of their own choosing on which to search.

Thus, it is evident that there is a major need for an online research solution using the compare-contrast method, which enables the user to conduct research through compare-contrast methods in order to study, simulate, understand, learn, evaluate, analyze, review, reflect, judge, oppose, conclude, and decide among desired subjects in an efficient and streamlined manner.

It is therefore an objective of the present invention to provide a research solution utilizing the comparison-contrast method, which enables users to simultaneously compare and contrast attributes of a multiplicity of subjects within specific subject contexts.

It is a further objective of the present invention to provide a research solution that enables users to search within a multiplicity of subjects against a specific set of attribute-value configurations to arrive at an appropriate set of subjects for comparison-contrast research.

It is yet a further objective of the present invention to provide a custom research solution that enables users to conduct compare-contrast of subjects through highly customizable subject-attribute combination searches across various subject-attribute pairs, to arrive at an efficient and organized collection of research data for further comparison-contrast research.

It is yet a further objective of the present invention to provide a Universal Research Framework that can be embedded within any externally managed information system, which enables the user to perform the above three methods of comparison-contrast, configuration-searching, and custom researching against subjects under predefined and dynamic subject contexts for research purposes.

Other objectives of this invention will be evident from the following disclosure.

SUMMARY OF THE INVENTION

The present invention discloses a computer-based research solution comprising four interrelated systems and methods of using same. The present invention provides four interrelated systems and methods for a universal research solution, capable of comparing and contrasting a potentially infinite number of subjects within predefined as well as dynamic subject contexts using interactive Compare-Contrast, a Configure-Filter-Search, and Custom-Research console user interfaces and a Universal Research Framework.

In one aspect, the invention comprises a system, known as the Compare-Contrast console, and a method of using same, for a research solution that compares and contrasts user selected subjects, enabling users to compare and contrast 'subject-attribute' combinations of potentially infinite numbers of subjects within predefined as well as dynamic subject contexts. This system and method is particularly suitable for users who know in advance the subjects to be researched.

The user provides one or more subjects to be compared and contrasted. Based on the subjects provided, the system provides one or more suitable subject contexts. The user selects one or more subject contexts based on the combination of subjects provided. If the subject contexts provided by the system are not suitable, the user browses for further related subject contexts. Upon selection of suitable subject contexts, the system assigns one or more subject attributes relevant to the selected subject contexts. The user continues to provide subjects and the system continues to provide additional choices of subject contexts until all desired subjects-subject contexts combinations are chosen. Optionally, the user further chooses additional subject contexts and associates/disassociates the subject attributes against which the subjects are to be compared and contrasted using advanced comparison.

Once all subjects and subject contexts are selected, the multiple subject-subject attribute combinations are searched within available data sources such as sponsored content sources or open content sources or a combination of both, and suitable search results are returned. The similarities and differences of the selected subjects compared against the selected subject attributes are measurable against indexes such as a 'similarity index' or a 'difference index'. The user may further add similar subjects within the selected subject contexts by proceeding to the Configure-Filter-Search console. The user also may conduct further research on the selected subjects within selected attributes by proceeding to the Custom-Research console.

As an example of the use of the Compare-Contrast console, a user may provide as a subject for research "Orlando". The system will provide potential high-level subject contexts, such as "Cities", "Places", "Business Centers", "Tourist Destinations", etc. The system may also suggest other potential high-level subject contexts, such as "People", "Entertainment", etc. The user selects the initial subject context (e.g., "Cities"). The user then provides additional subjects to research within this context, such as "San Francisco" and "Tokyo". The system takes into consideration the default attributes associated with the "Cities" context selected by the user (e.g., "city name", "population", "city mayor name", "state", etc.). If the user finds that the "subject attributes" suggested by the system for "Cities" are not adequate, for example because the user wishes to plan a vacation, the user may change the subject context by browsing the subject context hierarchy, beginning with contexts related to the "City" context (e.g., "Tourist Destinations", "Real Estate", etc.). The user then may select a new subject context (e.g., "Tourist Destinations"). This detailed subject context provides further subject attributes for comparison (e.g., "places to see", "places to sleep", "night life", "tourist maps", etc.)

The user also may optionally customize the subject contexts and subject attributes. Thus, continuing the example, the user may choose "Real Estate" as another subject context since the user is also interested in buying a property in one of the selected cities. This additional subject context associates additional subject attributes for comparison (e.g., "Average Selling Price", "Real Estate Agents", "Average Rent", "Rental Agencies", etc.). The user may disassociate certain subject attributes such as "Average Rent" and "Rental Agencies" since the user is interested in buying, not renting. Based on the user selection of subjects and subject attributes, the system then searches the available data sources (e.g., sponsored content sources or open content sources or a combination of both) and returns the results in a useful, user-friendly format for comparing and contrasting. The user may then use the Configure-Filter-Search console to retrieve other "Tourist Destinations" subjects that are similar within the subject context (e.g., "Las Vegas", "Miami", etc.). The user may also conduct a custom research on a selection of the retrieved subjects against some customized subject attributes by proceeding to the Custom-Research console, as further described below.

Another aspect of the present invention relates to a system, known as the Configure-Filter-Search console, and a method for using same, for a research solution that allows users to customize subject attribute-value configurations to then be used to search within a potentially infinite number of subjects to arrive at an appropriate set of relevant subjects for further research. This method is particularly suitable for the user who knows the subject contexts that is to be researched, but requires assistance with selecting suitable subjects within those subject contexts.

In this method, the user first selects a specific subject context to be researched. Upon the selection of a specific subject context, the system provides additional relevant subject contexts, from which the user may select one or more additional subject contexts. The system then provides related subject attributes and value ranges if available, along with suitable filtering criteria. The user customizes the desired subject attribute values by setting the filters, and the system dynamically provides appropriate sets of relevant subjects for further research by searching sponsored content sources or open content sources or a combination of both and returning the results. Upon selection of suitable subjects from the results provided by the system, the user may proceed to the Compare-Contrast console for further research of those subjects. The user may also conduct further research on the selected subjects within selected attributes by proceeding to the Custom-Research console.

As an example of the use of the Configure-Filter-Search console, a user selects a subject context for research (e.g., "Health"). The system will provide further potential related subject contexts, such as "Nursing", "Pharmacy", "Food & Nutrition", etc., related to the selected subject context. The user will select any desired additional subject contexts (e.g., "Food & Nutrition"). The system will continue to provide potential related subject contexts, such as "Diet", "Nutrition", "Cooking", etc., and the user will further be able to refine the appropriate subject context (e.g., "Nutrition"). Based on the subject context chosen by the user, the system will assign potential subject attributes (e.g., "Nutrition Categories", "Vitamins", "Micro Nutrients", etc.) and value ranges for selected subject attributes (e.g., for "Nutrition Categories" the range may include selection between "Fruits", "Vegetables", "Meats", etc.). Against appropriate attributes (e.g., "Nutrition Categories"), the user will select specific values (e.g., "Fruits"), and then the system searches the available data sources based on the selected values and returns relevant subjects (e.g., "Apple", "Apricot", "Cherries", etc.). The user may then compare the retrieved subjects (or a selected subset thereof) by proceeding to the Compare-Contrast console as described above (e.g., to compare the "Vitamin Content" of "Apple", to the "Vitamin Content" of "Apricots" and "Cherries"). The user may also conduct a custom research on a selection of the retrieved subjects against customized subject attributes by proceeding to the Custom-Research console.

A further aspect of the present invention relates to a system known as the Custom-Research console, and a method for use of same, for a research solution by which the user is empowered to perform research efficiently using a custom comparison platform. This method involves a highly personalized search, collation, and compilation of comparison-contrast information for potentially infinite numbers of subjects, within predefined as well as dynamic subject contexts searched within various data sources such as sponsored content sources or open content sources or a combination of both. This method is particularly suitable for users who require highly customized research for subject-attribute combinations that may not be available through the Compare-Contrast console. The user may further add similar subjects within the selected subject context by proceeding to the Configure-Filter-Search console. The user also may conduct further research on the subjects with the Compare-Contrast console when the user requires a definitive set of information values and a suggestive list of information sources simultaneously.

In this method, the user first selects a subject context. Based on the subject context selected, the system may provide the user with further relevant subject contexts, and the user may browse for further subject contexts to refine the choice. Upon selection of an appropriate subject context, the system displays a Custom-Research console user interface where the user provides one or more subjects and one or more subject attributes against to conduct research. The system searches for relevant subject-attribute combinations among the subject context provided within various data sources such as sponsored content sources, open content sources, or a combination of both, and returns the most relevant results for each of the subject-attribute combinations provided by the user. In a conventional research method of comparing and contrasting subjects, the user would be required to conduct every subject-attribute combination search individually, identify suitable information by reviewing each such search result, and then collate selected information into a compare-contrast matrix. The advantage of the disclosed system and method is the ability to query multiple subject-attribute combinations in a single search, yielding the subject-attribute combination results in a highly organized compiled format for further research purposes.

As an example of the use of the Custom-Research console, a user may know nothing about "Tango", "Rumba", and "Waltz" (subjects) other than that they are "Dance forms" (subject context). The user first selects a subject context for research (e.g., "Arts"). The system will provide further related detailed subject contexts, such as "Architecture", "Painting", "Performing Arts", etc. The user may refine the subject context by browsing until the appropriate subject context is selected (e.g., "Dance forms"). Upon selection of the subject context, the system displays a Custom-Research console user interface, where the user provides the subjects ("Tango", "Rumba", and "Waltz") and the subject attributes against which to conduct online research (e.g., "History", "Music", "Technique", and "Culture"). The system takes these user inputs and searches for relevant subject-attribute combinations among the subject context provided within various data sources and displays the search result values within the Custom-Research console user interface. The most relevant search result values for each subject-attribute combination are provided as editable text, which the user may modify.

In addition, one or more relevant web links against each subject-attribute combinations may also be displayed to enable further research on the said combinations. The user may then use the Configure-Filter-Search console to retrieve other "Dances" that are similar within the subject context (e.g., "Argentinean Tango", "Uruguayan Tango", etc.). The user may then include one or more such similar items and use the Compare-Contrast console to conduct further research (e.g., subjects "Argentinean Tango" and "Uruguayan Tango" against subject attributes "History", "Music", "Technique", and "Culture"). It is thus shown how the various systems and methods interact with one another to provide different levels of research functionality to the user.

Yet another aspect of the invention relates to a system known as the Universal Research Framework that is suitably adapted to be embedded within any externally managed information system and which enables a user to perform the above three methods of Compare-Contrast, Configure-Filter-Search or Custom-Research against subjects within the specific information system under predefined and dynamic subject contexts. The Universal Research Framework system is particularly suitable for users of any separately managed information system such as information portals, knowledge management systems, or enterprise information systems. This system involves integrating the Universal Research Framework within the said information systems to retrieve information for research using the three previous methods in Compare-Contrast console, Configure-Filter-Search console and Custom-Research console.

Other features and advantages of the invention are described below.

DETAILED DESCRIPTION OF THE INVENTION

Figure 1:
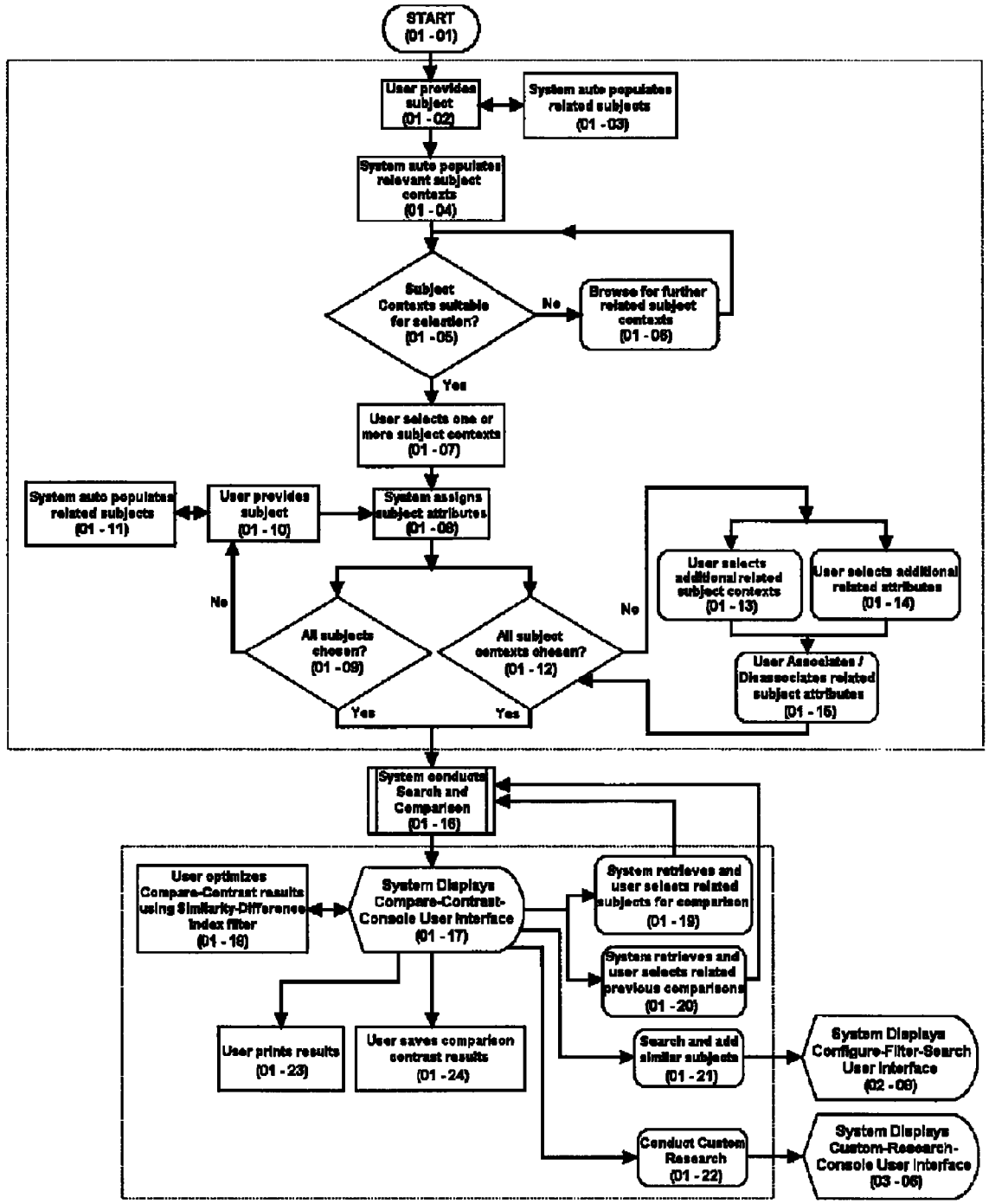
FIG. 1 is a flowchart illustrating the processing steps of the Comparison-Contrast method.

The present invention comprises multiple integrated methods for conducting research on a multiplicity of research subjects, and integrated computer-based systems for performing said methods.

The methods include a method which enables a user to compare and contrast subject-attribute combinations of a multiplicity of subjects within predefined as well as dynamic contexts, known as the Compare-Contrast method; a method which enables a user to customize a set of attribute-value configurations associated with a context and then search a multiplicity of subjects related to said attribute-value configurations to arrive at an appropriate subset of relevant subjects for further research, known as the Configure-Filter-Search method; and a method which enables a user to customize contexts and subject-attribute combinations and then search a multiplicity of user-provided subjects related to said context and subject-attribute combinations to arrive at relevant search results for research, known as the Custom-Research method.

The systems include a computer-based system for performing the Compare-Contrast method, a computer-based system for performing the Configure-Filter-Search method, a computer-based system for performing the Custom-Research method, and a system for integrating the Compare-Contrast method, the Configure-Filter-Search method, and the Custom-Research methods with any externally managed computer-based information system.

In each of the foregoing methods and systems, certain terms have consistent definitions and usages. A "subject" is an item having information associated with it. This information is both categorical and specific. The categorical information is defined as a collection of one or more "attributes". Similar subjects may have similar attributes. For any attribute associated with a subject, there are one or more "values". For example, a subject may be "apple". It may have the attributes of "color" and "shape" (as well as other attributes). For the color attribute the values may be "red" and "green". For the shape attribute the value may be "spherical". Similarly, a subject of "orange" may have similar attributes (as well as other attributes), with the color attribute having the value "orange" and the shape attribute having the value "spherical".

A context is a collection of attributes applicable to one or more subjects. For example, a context may be "fruit". The fruit context may have attributes of "color", "shape", "flavor", "nutrition", and others. Within the fruit context, in the above example the attributes of color and shape will allow the comparison of apples to oranges. Another context may be "computers". The computer context may have attributes of "type", "manufacturer", "cost", and others. Within this context, apple (or "Apple™") may be compared to Dell™ or HP™, but not to orange. Thus, the selection of a context defines the limits of the research that can be conducted.

Moreover, contexts may be related to other contexts, sharing attributes in either a hierarchical or overlapping relationship. For example, a context of "Opera" may be related to the context of "$19^{th}$ Century Opera", whereby the latter would be a sub-context of the former, in which the attributes associated with $19^{th}$ Century Opera would be a subset of the attributes associated with Opera. On the other hand, Italian Opera would be a related, but not hierarchically related, context with respect to $19^{th}$ Century Opera. That is, some attributes associated with Italian Opera will overlap with some attributes associated with $19^{th}$ Century Opera, but others will differ.

The methods and systems disclosed in the present invention make use of the concepts of subject, attribute, value, and context to perform multivariable research, as further described in more detail below.

A. The Compare-Contrast Method

The Compare-Contrast method is shown as a flow chart in FIG. 1. In one embodiment the Compare-Contrast method is conducted online, over the internet using a communications network. In other embodiments the Compare-Contrast method may be conducted offline, over an intra-net, or as a stand-alone application.

The Compare-Contrast method comprises the steps of:
(1) the user providing a first subject through a Compare-Contrast console user interface (01-02);
(2) selecting a context in which to compare and contrast the first subject;
(3) associating one or more attributes with the first subject (01-08);
(4) the user providing one or more additional subjects to compare and contrast through the Compare-Contrast console user interface (01-10);
(5) associating in combination with each additional subject the one or more attributes associated with the first subject (01-08);
(6) conducting a comparison-contrast search of the combination of the first subject and the one or more attributes associated with the first subject against the one or more combinations of the one or more additional subjects and the one or more attributes associated with the one or more additional subjects (01-16); and
(7) the system displaying the search results on the Compare-Contrast console user interface (01-17).

The selection of a context in step (2) is achieved by performing the following substeps:
(2-a) the system providing one or more contexts (01-04); and
(2-b) the user selecting one or more contexts from the contexts provided by the system through the Compare-Contrast console user interface (01-07).

The association of one or more attributes with the first subject is achieved by performing the following substeps:
(3-a) the system retrieving one or more attributes associated with the one or more contexts selected by the user; and
(3-b) the system associating in combination with the first subject the one or more attributes associated with the one or more contexts selected by the user.

The comparison-contrast search is achieved by performing the following substeps:

(6-a) searching the subject-attribute combinations within available data sources; and (6-b) retrieving search results for the subject-attribute combinations.

The user provides the first subject for research. In one embodiment this may involve the user simply free typing the name of the first subject into a user input area of the Compare-Contrast console user interface. In a more preferred embodiment, the user is assisted in providing the first subject in step (1) by the system providing a list of potential first subjects through look-ahead functionality (01-03). That is, as the user begins to enter a name for the first subject, the system will retrieve potential subject names matching the input from the user. The matches may be made available to the user by display in a selectable drop-down menu, or the first match may auto-populate the input location. Other methods for providing look-ahead functionality to the user are also contemplated by the present invention. In this embodiment, the user may be restricted to selecting a first subject to those provided through the look-ahead functionality. In the most preferred embodiment the user may either choose a first subject from those provided through the look-ahead functionality or may over-ride the provided list and enter the name of a different first subject.

The selection of the one or more additional subjects to compare and contrast against the first subject may be limited to optimize search performance. In such cases the selection of additional subjects is limited to a pre-defined number of additional subjects. This process may be repeated after each search.

The selection of a context in which the first subject will be researched is made from a predefined set of contexts (01-04). These contexts may be created and associated with attributes during implementation of the method, or by dynamic creation through input of users, or both. In one embodiment the user may select a context from the entire list of contexts. In a preferred embodiment the available contexts for selection are limited by their relevance to the selected first subject. In the most preferred embodiment, the user may browse available contexts, whereby the contexts may be hierarchically related or related in a non-hierarchical manner, for example, in a mind-map relationship (01-06). The user browses from one context to another, and perhaps back again, until a desired context is revealed, and then the context is selected by the user (01-07).

In yet another embodiment additional related contexts may be selected (01-13). The user may select the additional related contexts in the same manner as described above in selecting the first context. Upon selection of one or more additional related contexts, the system retrieves one or more attributes associated with the one or more additional related contexts. These one or more attributes are then associated in combination with the first subject selected by the user.

In still another embodiment the user may modify the attributes associated with the first subject by selecting from the list of attributes currently associated with the first subject (01-14), whereby selected attributes remain associated with the first subject but non-selected attributes are disassociated from the first subject (01-15). If additional subjects were previously selected by the user, the selected attributes remain associated with each of the additional subjects and non-selected attributes are disassociated from each of the additional subjects.

The available data sources to be searched (01-16) may be one or more sponsored content repositories associated with the selected one or more contexts or one or more open content sources associated with the selected one or more contexts. If relevant information cannot be retrieved from the one or more sponsored content repositories or the one or more open content sources, the World Wide Web may be searched. In the alternative, the World Wide Web may be the primary data source.

In one embodiment of the Compare-Contrast method the user can manipulate the search results to narrow the focus of the research (01-18). In the preferred embodiment search results optimization is achieved by use of a similarity/difference index filter. The user selects one subject as the baseline and then selects a similarity/difference index by which to compare the remaining subjects against the selected baseline subject. The subjects are compared to select a subset of the search results associated with the subjects, whereby the subset of search results falls within a similarity/difference range determined by the selected similarity/difference index. Those search results falling within the subset are displayed and the search results not falling within the subset are not displayed.

In the most preferred embodiment the similarity/difference index constitutes a range from −1 to 1, whereby a similarity/difference index of −1 means the compared information should be selected if it is entirely different from the baseline information, a similarity/difference index of 1 means the compared information should be selected if it is exactly the same as the baseline information, a similarity/difference index of between −1 and 1 means the compared information should be selected if it is of a proportional degree of similarity to the baseline information, and a similarity/difference index of 0 means that no filtering should be performed by the similarity/difference index filter. The user selects the similarity/difference range by which to filter the subjects by selecting a similarity/difference index. Thus, where the search result may have returned information on multiple subjects, some of the subjects may be closely related and others may be unrelated. Selecting a positive similarity/difference index will focus the research results on the information that is more similar, while selecting a negative similarity/difference index will focus the research results on the information that is more dissimilar. Selecting a similarity/difference index of 0 will display all the information without any filtering.

The user is given the option to expand the research by comparing and contrasting the user selected subjects against additional related subjects provided by the system (01-19). The system retrieves one or more related subjects related to the one or more contexts selected by the user and provides them to the user for selection. Each additional related subject selected by the user has associated with it the one or more attributes previously associated with the first subject. Then a new comparison-contrast search is performed (01-16) and the results are displayed (01-17).

The user is also given the option to expand the research by comparing and contrasting the user selected subjects against previously saved research results (01-20). The system retrieves one or more previously saved research results and extracts therefrom one or more subjects for comparison. Each such subject has associated with it the one or more attributes previously associated with the first subject. Then a new comparison-contrast search is performed (01-16) and the results are displayed (01-17).

Search results may be displayed in a summarized format by default with the user having the option to display the search results in a detailed format upon request. This may be achieved through a pop-up window containing the detailed results, or by providing a link to a web page.

Search results may be saved by the user (01-24) or printed out in a variety of user-selected formats (01-23). Search results may be provided to a Configure-Filter-Search console user interface to determine further related subjects suitable for related research (01-21). Search results may also be provided to a Custom-Research console user interface for related research (01-22).

B. The Configure-Filter-Search Method

Figure 2:
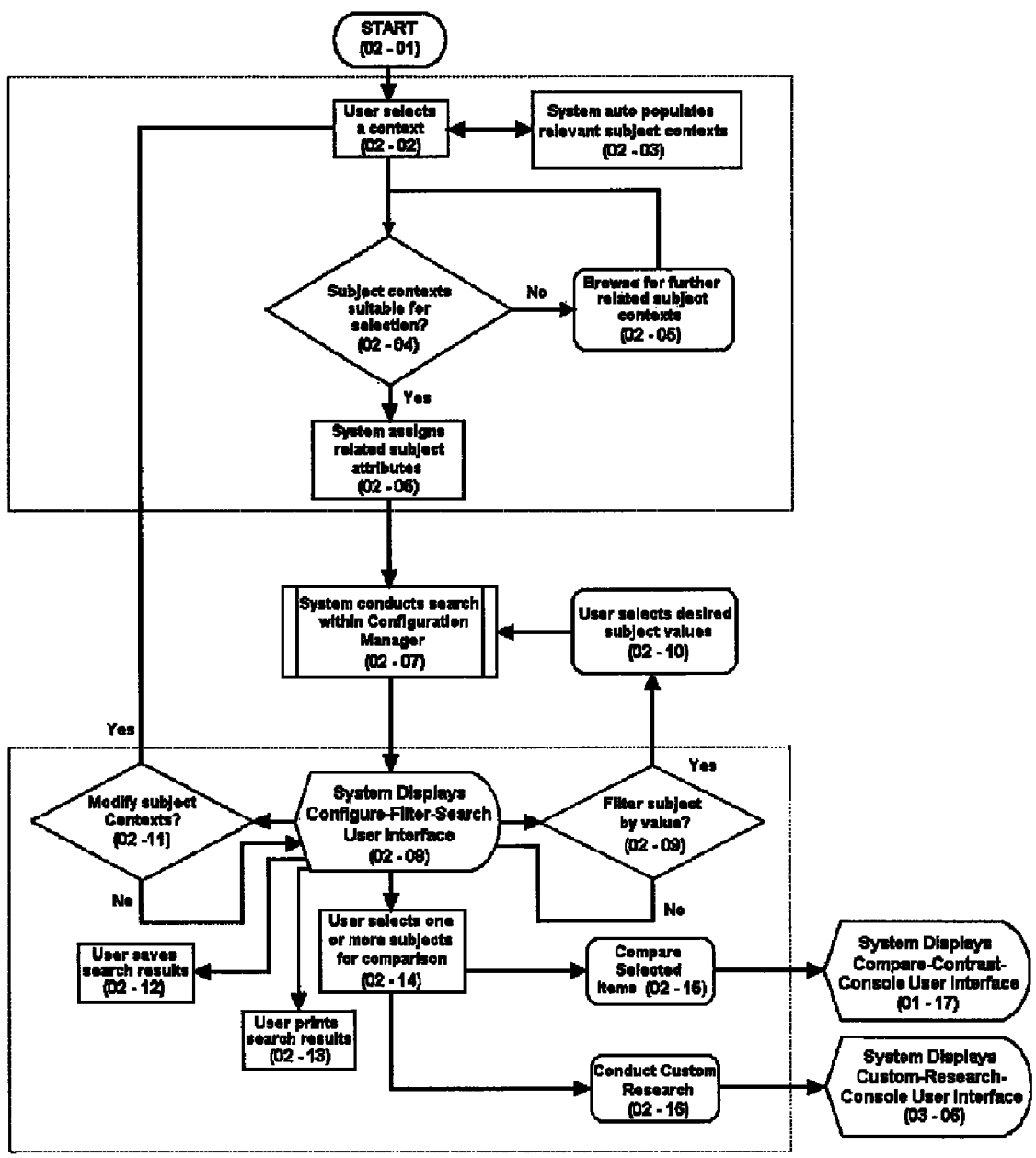
FIG. 2 is a flowchart illustrating the processing steps of the Configure-Filter-Search method.

The Configure-Filter-Search method is shown as a flow chart in FIG. 2. In one embodiment the Configure-Filter-Search method is conducted online, over the internet using a communications network. In other embodiments the Configure-Filter-Search method may be conducted offline, over an intra-net, or as a stand-alone application.

The Configure-Filter-Search method comprises the steps of:
(1) selecting a context through a Configure-Filter-Search console user interface (02-02), with the context having associated with it one or more attributes (02-06);
(2) conducting a configure-filter-search of the context selected by the user to retrieve one or more subjects and values associated with the context attributes (02-07); and
(3) displaying on the Configure-Filter-Search console user interface the one or more retrieved subjects, and for each subject displaying the attributes and values associated therewith (02-08).

The selection of a context in step (1) is achieved by performing the following substeps:
(1-a) the system providing one or more contexts for selection by the user, each said context having associated therewith one or more attributes; and
(1-b) the user selecting one context through the Configure-Filter-Search console user interface.

The conducting of the configure-filter-search in step (2) is achieved by performing the following substeps:
(2-a) the system retrieving one or more subjects having at least the one or more attributes associated with the context selected by the user; and
(2-b) for each retrieved subject, the system retrieving values associated with said one or more attributes.

The user may be assisted in selecting a context through look-ahead functionality (02-03) or by browsing a list of related contexts (02-05), as described above. The user may also select multiple related contexts (02-11).

The available data sources to be searched (02-07) may be one or more sponsored content repositories associated with the selected one or more contexts or one or more open content sources associated with the selected one or more contexts. If relevant information cannot be retrieved from the one or more sponsored content repositories or the one or more open content sources, the World Wide Web may be searched. In the alternative, the World Wide Web may be the primary data source.

In one embodiment of the Configure-Filter-Search method the user can manipulate the search results to narrow the focus of the research (02-09). In this embodiment the values retrieved by the system are displayed as a summary of values. The user selects one or more desired values from the summary of values (02-10). The system then retrieves one or more subjects having at least the one or more desired values associated therewith (02-07), and displays the results on the Configure-Filter-Search console user interface (02-08). In the preferred embodiment, the user selects the one or more desired values by setting a highest allowable value and a lowest allowable value. All values falling between the selected highest allowable value and the selected lowest allowable value, inclusive, are included in the new search (02-07).

Search results may be saved by the user (02-12) or printed out in a variety of user-selected formats (02-13). User selected search results (02-14) may be provided to a Compare-Contrast console user interface to perform an in-depth comparison and contrast of the subjects (02-15). User selected search results (02-14) may also be provided to a Custom-Research console user interface for related research (02-16).

C. The Custom-Research Method

Figure 3:
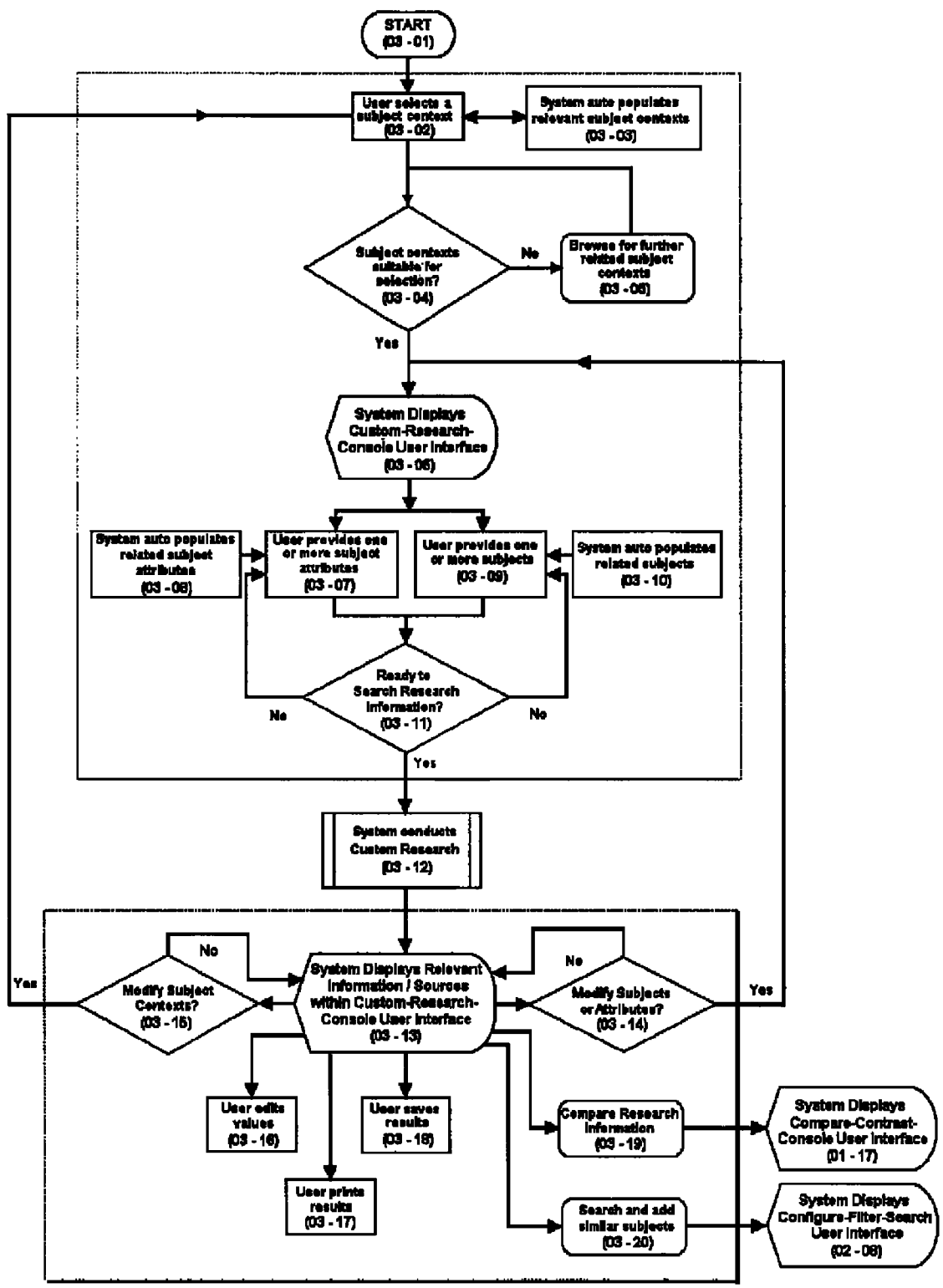
FIG. 3 is a flowchart illustrating the processing steps of the Custom-Research method.

The Custom-Research method is shown as a flow chart in FIG. 3. In one embodiment the Custom-Research method is conducted online, over the internet using a communications network. In other embodiments the Custom-Research method may be conducted offline, over an intra-net, or as a stand-alone application.

The Custom-Research method comprises the steps of:
(1) selecting a context through a Custom-Research console user interface, with the context having associated with it one or more attributes (03-02);
(2) providing one or more subject-attribute combinations through the Custom-Research console user interface;
(3) searching the selected subject-attribute combinations within the selected context, and for each subject-attribute combination, the system retrieving any values associated with the subject-attribute combination (03-12); and
(4) displaying the retrieved values, if any, on the Custom-Research console user interface (03-13).

The selection of a context in step (1) is achieved by performing the following substeps:
(1-a) the system providing one or more contexts for selection by the user, with each context having associated with it one or more attributes; and
(1-b) the user selecting one context through the Custom-Research console user interface.

The subject-attribute entries provided by the user are displayed on the Custom-Research console user interface (03-06).

The provision of one or more subject-attribute combinations in step (2) is achieved by performing the following substeps:
(2-a) the user providing one or more subjects through the Custom-Research console user interface (03-07); and
(2-b) the user providing one or more additional attributes applicable to each user provided subject through the Custom-Research console user interface (03-09).

The user may be assisted in selecting a context through look-ahead functionality (03-03) or by browsing a list of related contexts (03-05), as described above. The user may also override the system choices of context by directly inputting a desired context. The user may be assisted in providing subjects through look-ahead functionality (03-08) and in providing attributes through look-ahead functionality (03-10).

The provision by the user of the one or more subjects to research may be limited to optimize search performance. Likewise, the provision of the one or more attributes may be limited. In such cases the provision of subjects and attributes by the user is limited to a pre-defined number of subjects and attributes. This process may be repeated after each search (03-14). Contexts may also be modified as the research continues (03-15). The user may provide new subjects and/or attributes once a new context is selected, or research may continue on the previously provided subjects and attributes.

In one embodiment the values retrieved by the system in step (3) are prioritized by relevance. For each subject-attribute combination only the value having the highest relevance to the subject-attribute combination is displayed. The lower priority values may be available to the user through a drop down menu. They may also be available as links to web pages.

In another embodiment the user may edit one or more of the values retrieved by the system (03-16). The edits may be saved or printed, or incorporated within the knowledge base for future research.

The available data sources to be searched (03-12) may be one or more sponsored content repositories associated with the selected one or more contexts or one or more open content sources associated with the selected one or more contexts. If relevant information cannot be retrieved from the one or more sponsored content repositories or the one or more open content sources, the World Wide Web may be searched. In the alternative, the World Wide Web may be the primary data source.

Research results may be saved by the user (03-18) or printed out in a variety of user-selected formats (03-17). Research results may be provided to a Compare-Contrast console user interface to perform an in-depth comparison and contrast of the subjects (03-19). Research results may also be provided to a Configure-Filter-Search console user interface to determine further related subjects suitable for related research (03-20).

D. The Compare-Contrast System

The Compare-Contrast system is a computer-based system for conducting research on a multiplicity of research subjects. It is suitably adapted to perform the Compare-Contrast method described above. In one embodiment the Compare-Contrast system operates online, over the internet using a communications network. In other embodiments the Compare-Contrast system may be operated offline, over an intranet, or as a stand-alone application.

In one embodiment the Compare-Contrast system comprises a subject selection module, suitably adapted to allow a user to provide a first subject to compare and contrast and to provide one or more additional subjects to compare and contrast against the first subject; a context selection module, suitably adapted to retrieve from a storage medium one or more contexts and to provide such contexts to the user for selection of one or more said contexts; an attribute selection module, suitably adapted to retrieve from a storage medium one or more attributes associated with the one or more contexts selected by the user; an attribute association module, suitably adapted to associate the retrieved attributes in combination with the first subject and in combination with the one or more additional subjects; a comparison-contrast module, suitably adapted to compare the combination of the first subject and the one or more attributes associated therewith against the one or more combinations of the one or more additional subjects and the one or more attributes associated therewith, by searching the subject-attribute combinations within available data sources and by retrieving search results for the subject-attribute combinations; and a display module, suitably adapted to receive user input and display the search results through a Compare-Contrast console user interface.

In one embodiment the subject selection module is capable of assisting the user in providing the name for the first subject by providing potential names through look-ahead functionality. In another embodiment the one or more contexts retrieved by the context selection module and provided to the user for selection are retrieved based on their relevance to the first subject. In yet another embodiment the context selection module allows the user to override one or more of the contexts retrieved by the context selection module prior to the user selecting one or more contexts. This may be done by browsing a selection of one or more related contexts.

In another embodiment, the subject selection module is suitably adapted to retrieve from a storage medium one or more related subjects which are related to the first subject, and then to provide said the related subjects to the user for selection to compare and contrast against the first subject. In this embodiment the attribute association module is suitably adapted to associate the one or more attributes retrieved by the attribute selection module with the related subjects selected by the user and the comparison-contrast module is suitably adapted to compare the combination of the first subject and its attributes against the related subjects and their attributes.

In yet another embodiment the subject selection module is suitably adapted to retrieve from a storage medium one or more previously saved search results associated with the contexts selected by the user for the first subject. Upon selection of these saved search results, their subjects are used to compare and contrast against the first subject. The comparison-contrast module is suitably adapted to compare the combination of the first subject and its attributes against the subjects from the previously saved search results selected by the user.

In yet another embodiment the subject selection module is suitably adapted to allow a user to select at most a pre-defined limited number of additional subjects at one time so that search performance is optimized. The user may select additional subjects exceeding the limit on an iterative basis.

In another embodiment the attribute association module is further suitably adapted to associate the one or more attributes selected by the user with the first subject and with the additional subjects selected by the user, and to disassociate from the first subject and from the additional subjects the attributes not selected by the user. This functionality allows the research to be narrowed just to the set of desired attributes.

In another embodiment the display module is suitably adapted to display the search results in a summarized format by default and to display the search results in a detailed format upon request by the user. The full detail may be made available in a popup window, or by a web link, or by other means known in the art.

In yet another embodiment the Compare-Contrast system further comprises a results manipulation module. The results manipulation module is suitably adapted to manipulate the search results to optimize them by use of a similarity/difference index filter contained therein. The user selects one subject as a baseline and selects a similarity/difference index by which to compare the remaining subjects against the selected subject. The similarity/difference index filter compares each of the remaining subjects against the user selected subject to select a subset of the search results associated with each remaining subject. The subset of search results falls within a similarity/difference range determined by the selected similarity/difference index. Only the subset of search results is displayed, thereby focusing the results for the user.

In a variation of this embodiment, the similarity/difference index ranges from −1 to 1, whereby a similarity/difference index of −1 means the compared information should be selected if it is entirely different from the baseline information, a similarity/difference index of 1 means the compared information should be selected if it is exactly the same as the baseline information, a similarity/difference index of between −1 and 1 means the compared information should be selected if it is of a proportional degree of similarity to the baseline information, and a similarity/difference index of 0 means that no filtering should be performed by the similarity/ difference index filter. The user selects a similarity/difference index that is applied across all selected subjects. This index may be manipulated dynamically, so that the same set of subjects may be considered with different emphases.

In yet another embodiment the Compare-Contrast system further comprises a save module, suitably adapted to save the search results in one or more useful formats. These saved results may be retrieved by the subject selection module, as described above. It may also comprise a print module, suitably adapted to print the search results in one or more useful formats.

In yet another embodiment the Compare-Contrast system further comprises a Configure-Filter-Search console interface module, suitably adapted to provide the search results to a Configure-Filter-Search console user interface which allows performance of the Configure-Filter-Search method.

In yet another embodiment the Compare-Contrast system further comprises a Custom-Research console interface module, suitably adapted to provide the search results to a Custom-Research console user interface which allows performance of the Custom-Research method.

E. The Configure-Filter-Search System

The Configure-Filter-Search system is a computer-based system for conducting research by enabling a user to customize a set of attribute-value configurations associated with a context and then search a multiplicity of subjects related to the attribute-value configurations to arrive at an appropriate subset of relevant subjects for further research. It is suitably adapted to perform the Configure-Filter-Search method described above. In one embodiment the Configure-Filter-Search system operates online, over the internet using a communications network. In other embodiments the Configure-Filter-Search system may be operated offline, over an intranet, or as a stand-alone application.

In one embodiment the Configure-Filter-Search system comprises a context selection module, suitably adapted to allow a user to select a context having associated with it one or more attributes; a configure-filter-search module, suitably adapted to retrieve from a data source one or more subjects having at least the one or more attributes associated with the selected context, and to retrieve from the data source for each retrieved subject one or more values associated with the attributes; and a display module, suitably adapted to receive user input and display retrieved subjects and associated values through a Configure-Filter-Search console user interface.

In one embodiment the context selection module is capable of assisting the user in selecting the name for a context by providing potential names through look-ahead functionality. In another embodiment one or more contexts are retrieved by the context selection module and provided to the user for selection by browsing. Related contexts may be browsed through any suitable means, with the contexts related hierarchically or multiply linked or other suitable relationships.

In another embodiment the display module is suitably adapted to display the retrieved values as a summary of values on the Configure-Filter-Search console user interface. In this embodiment the Configure-Filter-Search system may further comprise a user manipulation module. The user manipulation module is suitably adapted to allow the user to select one or more desired values from the summary of values displayed by the display module, after which the configure-filter-search module retrieves from the data source one or more subjects having associated therewith the one or more values selected by the user through the user manipulation module. In the preferred embodiment of this variation, the user manipulation module is adapted to allow the user to select a highest allowable value and a lowest allowable value, with the desired values being those values falling between the highest allowable value and the lowest allowable value.

In another embodiment the Configure-Filter-Search system further comprises a save module, suitably adapted to save the search results in one or more useful formats. It may also comprise a print module, suitably adapted to print the search results in one or more useful formats.

In yet another embodiment the Configure-Filter-Search system further comprises a Compare-Contrast console interface module, suitably adapted to provide the search results to a Compare-Contrast console user interface which allows performance of the Compare-Contrast method.

In yet another embodiment the Configure-Filter-Search system further comprises a Custom-Research console interface module, suitably adapted to provide the search results to a Custom-Research console user interface which allows performance of the Custom-Research method.

F. The Custom-Research System

The Custom-Research system is a computer-based system for conducting research by enabling a user to customize contexts and subject-attribute combinations and then search a multiplicity of subjects related to said context and subject-attribute combinations to arrive at relevant values for research. It is suitably adapted to perform the Custom-Research method described above. In one embodiment the Custom-Research system operates online, over the internet using a communications network. In other embodiments the Custom-Research system may be operated offline, over an intranet, or as a stand-alone application.

In one embodiment the Custom-Research system comprises a context selection module, suitably adapted to allow a user to select a context having associated with it one or more attributes; a subject selection module, suitably adapted to allow a user to provide one or more subjects to research; an attribute selection module, suitably adapted to allow a user to provide one or more attributes to research; a search module, suitably adapted to retrieve from a data source one or more values associated with each subject-attribute combination selected by the user within the user selected context; and a display module, suitably adapted to receive user input and to display retrieved values through a Custom-Research console user interface.

In one embodiment the context selection module is capable of assisting the user in selecting the name for a context by providing potential names through look-ahead functionality. In another embodiment one or more contexts are retrieved by the context selection module and provided to the user for selection by browsing. Related contexts may be browsed through any suitable means, with the contexts related hierarchically or multiply linked or other suitable relationships. Alternatively, the user may override the contexts provided by the context selection module directly entering the name of a context.

In another embodiment the subject selection module is adapted to limit the user to providing at most a pre-defined limited number of subjects so that search performance is optimized. Similarly, the attribute selection module limits the user to providing at most a pre-defined limited number of attributes. The maximum number of subjects need not be the same as the maximum number of attributes. The user may provide additional subjects and attributes exceeding the respective limit on an iterative basis.

In another embodiment the search module is adapted to retrieve values as links to web pages. The search module may further prioritize the retrieved values by relevance. The display module then displays only the value having the highest relevance for each subject-attribute combination. The display module may be further adapted to permit the user to edit one or more of the displayed values. These edits may be captured as saved search results, or incorporated into the knowledge base for future research.

In another embodiment the Custom-Research system further comprises a context learning module. The context learning module permits the user to modify selected contexts by associating therewith one or more additional attributes provided by the user. The modification is permitted only if, for each additional attribute, any value is retrieved for the attribute in combination with the subjects provided by the user. Use of the context learning module provides for population of the knowledgebase by users over time.

In yet another embodiment the Custom-Research system further comprises a save module, suitably adapted to save the search results in one or more useful formats. It may also comprise a print module, suitably adapted to print the search results in one or more useful formats.

In yet another embodiment the Custom-Research system further comprises a Compare-Contrast console interface module, suitably adapted to provide the search results to a Compare-Contrast console user interface which allows performance of the Compare-Contrast method.

In yet another embodiment the Custom-Research system further comprises a Configure-Filter-Search console interface module, suitably adapted to provide the search results to a Configure-Filter-Search console user interface which allows performance of the Configure-Filter-Search method.

G. The Universal Research Framework System

Figure 4:
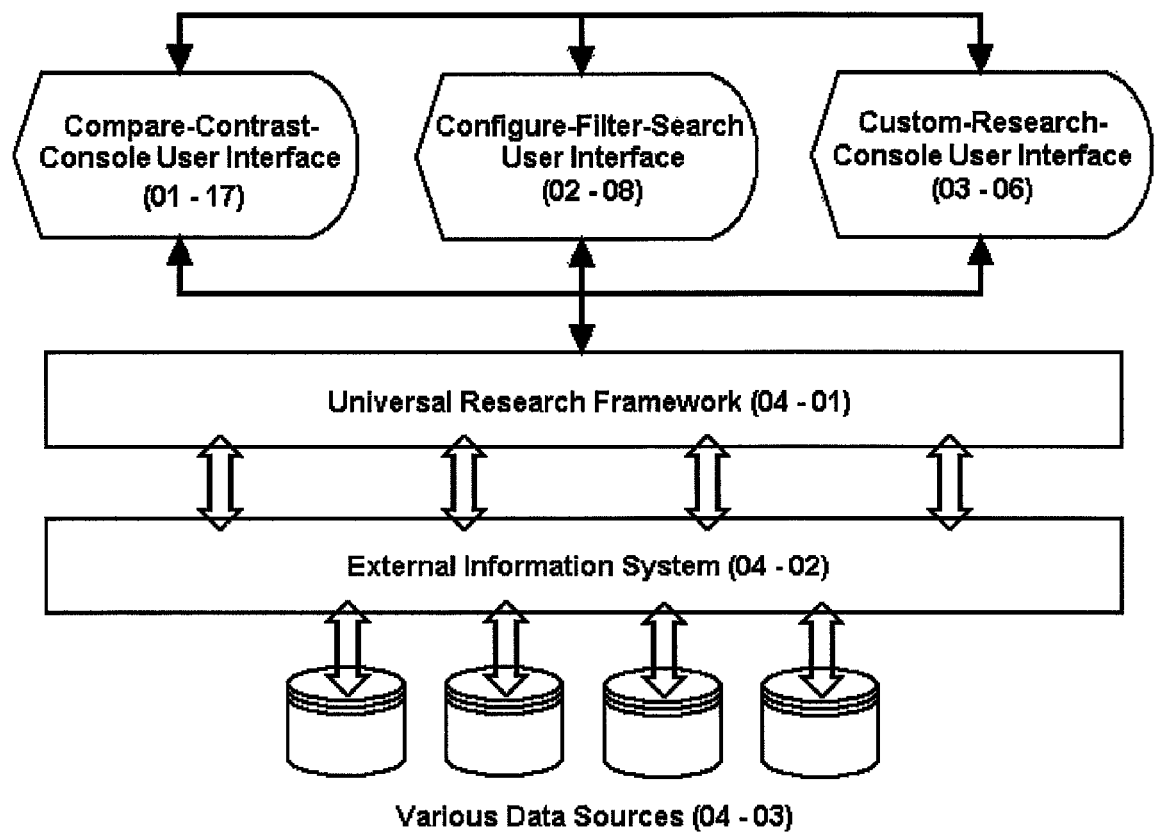
FIG. 4 is a block diagram of the Universal Research Framework system.

The Universal Research Framework is a computer-based system adapted to be embedded within any externally managed information system. A user may conduct the Compare-Contrast method described above, the Configure-Filter-Search method described above, and the Custom-Research method described above against data contained within the information system for research purposes. A block diagram of the Universal Research Framework system is shown in FIG. 4. In one embodiment the Universal Research Framework system operates online, over the internet using a communications network. In other embodiments the Universal Research Framework system may be operated offline, over an intranet, or as a stand-alone application.

The Universal Research Framework system comprises a system integration module, suitably adapted to integrate the Compare-Contrast system described above, the Configure Filter-Search system described above, and the Custom-Research system described above. It also comprises a system interface module, suitably adapted to integrate the externally managed information system with the system integration module.

Modifications and variations may be made to the disclosed embodiments of the present invention without departing from the subject or spirit of the present invention, and other embodiments not specifically set forth herein are also within the scope of the following claims.

I claim:

1. A method for conducting research on a multiplicity of research subjects, said method performed on a computer-based system embodied in computer software stored on and accessible from a computer-readable storage medium, said method suitably adapted to enable a user to compare and contrast subject-attribute combinations of a multiplicity of subjects within predefined as well as dynamic contexts, said method comprising the steps of:
    (1) the user providing a first subject;
    (2) selecting a context in which to compare and contrast the first subject by performing the following substeps:
        (2-a) the system providing one or more contexts; and
        (2-b) the user selecting one or more contexts;
    (3) associating one or more attributes with the first subject by performing the following substeps:
        (3-a) the system retrieving one or more attributes associated with said one or more contexts selected by the user; and
        (3-b) associating in combination with the first subject the one or more attributes associated with the one or more contexts selected by the user;
    (4) the user providing one or more additional subjects to compare and contrast;
    (5) associating in combination with each additional subject the one or more attributes associated with the first subject;
    (6) conducting a comparison-contrast search of the combination of the first subject and the one or more attributes associated therewith against the one or more combinations of the one or more additional subjects and the one or more attributes associated therewith by performing the following substeps:
        (6-a) searching the subject-attribute combinations within available data sources; and
        (6-b) retrieving search results for the subject-attribute combinations; and
    (7) displaying the search results on a Compare-Contrast console user interface.

2. The method of claim 1 wherein said method is internet-based and operates over a communications network.

3. The method of claim 1 wherein the one or more contexts provided by the system in substep (2-a) are selected based on relevance to the first subject.

4. The method of claim 1 wherein the user may override one or more of the contexts provided by the system in substep (2-a) prior to the user selecting one or more contexts in substep (2-b).

5. The method of claim 4 wherein the user overrides one or more of the contexts provided by the system in substep (2-a) by browsing a selection of one or more related contexts.

6. The method of claim 1 further comprising the step of:
    (5A) the user providing one or more additional contexts by performing the following substeps:
        (5A-a) the user selecting one or more additional contexts;
        (5A-b) the system retrieving one or more attributes associated with said one or more additional contexts selected by the user; and
        (5A-c) associating in combination with the first subject the one or more additional attributes associated with the one or more additional contexts selected by the user;
    whereby said step (5A) is performed after step (5) and prior to step (6).

7. The method of claim 1 further comprising the step of:
    (5A) the user modifying the attributes associated with the first subject by performing the following substeps:
        (5A-a) the user selecting one or more attributes from the attributes associated with the first subject;
        (5A-b) the system associating with the first subject the attributes selected by the user and disassociating from the first subject the attributes not selected by the user; and
        (5A-c) for each of the one or more additional subjects selected by the user in step (4), associating with said additional subject the attributes selected by the user and disassociating from said additional subject the attributes not selected by the user;

whereby said step (5A) is performed after step (5) and prior to step (6).

8. The method of claim 1 further comprising the following steps:
(6-c) retrieving one or more related subjects related to the one or more contexts selected by the user;
(8) providing one or more related subjects to compare and contrast by performing the following substeps:
(8-a) the user selecting for comparison one or more of the one or more related subjects retrieved during substep (6-c); and
(8-b) the system associating with each related subject selected by the user the one or more attributes associated with the first subject;
(9) conducting a comparison-contrast of the combination of the first subject and the one or more attributes associated therewith against the one or more combinations of the one or more related subjects and the one or more attributes associated therewith by performing the following substeps:
(9-a) searching the subject-attribute combinations within available data sources; and
(9-b) retrieving search results for the subject-attribute combinations; and
(10) displaying the search results on a Compare-Contrast console user interface;
whereby said substep (6-c) is performed after substep (6-b) and prior to step (7) and said steps (8), (9), and (10) are performed after step (7).

9. The method of claim 1 further comprising the following steps:
(6-c) retrieving previously saved search results associated with the one or more contexts selected by the user for the first subject;
(8) the user selecting for comparison one or more previously saved search results retrieved during step (6-c);
(9) conducting a comparison-contrast of the combination of the first subject and the one or more attributes associated therewith against the one or more previously saved search results selected by the user in step (8) by performing the following substeps:
(9-a) searching the subject-attribute combinations within available data sources; and
(9-b) retrieving search results for the subject-attribute combinations; and
(10) displaying the search results on a Compare-Contrast console user interface;
whereby said substep (6-c) is performed after substep (6-b) and prior to step (7) and said steps (8), (9), and (10) are performed after step (7).

10. The method of claim 1 further comprising the following step:
(8) manipulating the search results;
whereby said step (8) is performed after step (7).

11. The method of claim 1 further comprising the following step:
(8) manipulating the search results by performing the following substeps:
(8-a) optimizing the search results by use of a similarity/difference index filter, by the user selecting one subject as a baseline and selecting a similarity/difference index by which to compare the remaining subjects against the selected subject;
(8-b) comparing each of the remaining subjects against the user selected subject to select a subset of the search results associated with each said remaining subject, said subset of search results falling within a similarity/difference range determined by the selected similarity/difference index; and
(8-c) displaying the subsets of the search results and not displaying the search results not included within said subsets;
whereby said step (8) is performed after step (7).

12. The method of claim 11 wherein the similarity/difference index ranges from −1 to 1, whereby a similarity/difference index of −1 means the compared information should be selected if it is entirely different from the baseline information, a similarity/difference index of 1 means the compared information should be selected if it is exactly the same as the baseline information, a similarity/difference index of between −1 and 1 means the compared information should be selected if it is of a proportional degree of similarity to the baseline information, and a similarity/difference index of 0 means that no filtering should be performed by the similarity/difference index filter.

13. The method of claim 1 wherein the available data sources of substep (6-a) comprise the World Wide Web.

14. The method of claim 1 wherein the available data sources of substep (6-a) comprise one or more sponsored content repositories associated with the selected one or more contexts.

15. The method of claim 14 wherein the available data sources of substep (6-a) comprise the World Wide Web if relevant information cannot be retrieved from the one or more sponsored content repositories associated with the selected one or more contexts.

16. The method of claim 1 wherein the available data sources of substep (6-a) comprise one or more open content sources associated with the selected one or more contexts.

17. The method of claim 16 wherein the available data sources of substep (6-a) comprise the World Wide Web if relevant information cannot be retrieved from the one or more open content sources associated with the selected one or more contexts.

18. The method of claim 1 wherein step (7) further comprises displaying the search results in a summarized format by default and displaying the search results in a detailed format upon request by the user.

19. The method of claim 1 further comprising the following step:
(8) repeating steps (4), (5), (6), and (7);
wherein the selection of additional subjects in step (4) is limited to selecting at most a pre-defined limited number of additional subjects so that search performance is optimized;
whereby said step (8) is performed after step (7).

20. The method of claim 1 further comprising the following step:
(8) providing the search results to a Configure-Filter-Search console user interface to determine further related subjects suitable for related research;
whereby said step (8) is performed after step (7).

21. The method of claim 1 further comprising the following step:
(8) providing the search results to a Custom-Research console user interface for related research;
whereby said step (8) is performed after step (7).

22. A method for conducting research on a multiplicity of research subjects, said method performed on a computer-based system embodied in computer software stored on and accessible from a computer-readable storage medium, said method suitably adapted to enable a user to customize a set of attribute-value configurations associated with a context and then search a multiplicity of subjects related to said attribute-value configurations to arrive at an appropriate subset of relevant subjects for further research, said method comprising the steps of:

(1) selecting a context, said context having associated therewith one or more attributes, by performing the following substeps:
   (1-a) the system providing one or more contexts for selection by the user, each said context having associated therewith one or more attributes; and
   (1-b) the user selecting one context;
(2) conducting a configure-filter search of the context selected by the user by performing the following substeps:
   (2-a) the system retrieving one or more subjects having at least the one or more attributes associated with the context selected by the user; and
   (2-b) for each retrieved subject, the system retrieving values associated with said one or more attributes; and
(3) displaying on a Configure-Filter-Search console user interface the one or more retrieved subjects, and for each said subject displaying the retrieved attributes and values associated therewith.

23. The method of claim 22 wherein said method is internet-based and operates over a communications network.

24. The method of claim 22 wherein the user is assisted in selecting the context in substep (1-b) by browsing a selection of one or more contexts.

25. The method of claim 24 wherein multiple contexts are related to each other in a multiply linked configuration and the user may browse among said contexts to select the context as per substep (1-b).

26. The method of claim 25 wherein multiple contexts are related to each other hierarchically and the user may browse among said hierarchy of contexts to select the context as per substep (1-b).

27. The method of claim 22 wherein step (1) is repeated by the user until a suitable context is selected.

28. The method of claim 22 wherein the values retrieved by the system in substep (2-b) are retrieved from one or more sponsored content repositories.

29. The method of claim 28 wherein the values retrieved by the system in substep (2-b) are retrieved from the World Wide Web if relevant values cannot be retrieved from the one or more sponsored content repositories.

30. The method of claim 22 wherein the values retrieved by the system in substep (2-b) are retrieved from one or more selected open content sources.

31. The method of claim 30 wherein the values retrieved by the system in substep (2-b) are retrieved from the World Wide Web if relevant values cannot be retrieved from the one or more open content sources.

32. The method of claim 22 wherein the values retrieved by the system in substep (2-b) are retrieved from the World Wide Web.

33. The method of claim 22 wherein step (3) further comprises displaying the values retrieved by the system in substep (2-b) as a summary of values.

34. The method of claim 33 further comprising the following step:

(4) the user manipulating one or more of the subjects, attributes, and values displayed in step (3) by performing the following substeps:
   (4-a) the user selecting one or more desired values from the summary of values displayed in step (3);
   (4-b) the system retrieving one or more subjects having at least the one or more attributes associated with the context selected in substep (1-b), said subjects having associated therewith one or more values associated with said one or more attributes, said values consisting of the desired values; and
   (4-c) displaying on the Configure-Filter-Search console user interface only the one or more subjects retrieved in substep (4-b), and the set of attributes and values displayed in step (3);
whereby said step (4) is performed after step (3).

35. The method of claim 34 wherein the user selects one or more desired values in substep (4-a) by setting a highest allowable value and a lowest allowable value, with said one or more desired values being those values falling between said highest allowable value and said lowest allowable value, inclusive.

36. The method of claim 34 further comprising the following step:
(5) repeating steps (1) through (4);
whereby said step (5) is performed after step (4).

37. The method of claim 22 further comprising the following steps:
(4) the user selecting one or more subjects retrieved in substep (2-b); and
(5) providing the selected one or more subjects to a Compare-Contrast console user interface for comparing and contrasting;
whereby said step (4) is performed after step (3).

38. The method of claim 22 further comprising the following steps:
(4) the user selecting one or more subjects retrieved in substep (2-b); and
(5) providing the selected one or more subjects to a Custom-Research console user interface for further research;
whereby said step (4) is performed after step (3).

39. A method for conducting research on a multiplicity of research subjects, said method performed on a computer-based system embodied in computer software stored on and accessible from a computer-readable storage medium, said method suitably adapted to enable a user to customize contexts and subject-attribute combinations and then search a multiplicity of subjects related to said context and subject-attribute combinations to arrive at relevant search results for research, said method comprising the steps of:

(1) selecting a context, said context having associated therewith one or more attributes, by performing the following substeps:
   (1-a) the system providing one or more contexts for selection by the user, each said context having associated therewith one or more attributes; and
   (1-b) the user selecting one context;
(2) providing one or more subject-attribute combinations by performing the following substeps:
   (2-a) the user providing one or more subjects; and
   (2-b) the user providing one or more additional attributes applicable to each provided subject;
(3) searching the provided subject-attribute combinations within the selected context, and for each subject-attribute combination, the system retrieving any values associated with said subject-attribute combination; and
(4) displaying on a Custom-Research console user interface the retrieved values, if any.

40. The method of claim 39 wherein said method is internet-based and operates over a communications network.

41. The method of claim 39 further comprising the following step:
(5) modifying the user selected context by associating therewith one or more additional attributes provided by the user if, for each said additional attribute, any value was retrieved for said additional attribute in combination with the one or more subjects provided by the user in step (3);

whereby said step (5) is performed after step (4).

42. The method of claim 39 wherein the user is assisted in selecting the context in substep (1-b) by browsing a selection of one or more contexts.

43. The method of claim 42 wherein multiple contexts are related to each other in a multiply linked configuration and the user may browse among said contexts to select the context as per substep (1-b).

44. The method of claim 42 wherein multiple contexts are related to each other hierarchically and the user may browse among said hierarchy of contexts to select the context as per substep (1-b).

45. The method of claim 39 wherein the user overrides the one or more contexts provided by the system in substep (1-a) by direct input of a context.

46. The method of claim 39 wherein step (1) is repeated by the user until a suitable context is selected.

47. The method of claim 39 further comprising the following step:

(5) repeating steps (2), (3), and (4);

wherein the provision of subjects in substep (2-a) is limited to providing at most a pre-defined limited number of additional subjects so that search performance is optimized; and the provision of additional attributes in substep (2-b) is limited to providing at most a pre-defined limited number of additional attributes so that search performance is optimized;

whereby said step (5) is performed after step (4).

48. The method of claim 39 wherein the values retrieved by the system in step (3) are retrieved from one or more sponsored content repositories.

49. The method of claim 48 wherein the values retrieved by the system in step (3) are retrieved from the World Wide Web if relevant values cannot be retrieved from the one or more sponsored content repositories.

50. The method of claim 39 wherein the values retrieved by the system in step (3) are retrieved from one or more selected open content sources.

51. The method of claim 50 wherein the values retrieved by the system in step (3) are retrieved from the World Wide Web if relevant values cannot be retrieved from the one or more open content sources.

52. The method of claim 39 wherein the values retrieved by the system in step (3) are retrieved from the World Wide Web.

53. The method of claim 39 wherein the values retrieved by the system in step (3) are prioritized by relevance and for each subject-attribute combination only the value having the highest relevance to said subject-attribute combination is displayed.

54. The method of claim 39 wherein the values retrieved by the system in step (3) are links to web pages.

55. The method of claim 39 further comprising the following step:

(5) the user editing one or more of the one or more retrieved values;

whereby said step (5) is performed after step (4).

56. The method of claim 39 further comprising the following steps:

(5) the user selecting one or more subjects provided in substep (2-a); and (6) providing the selected one or more subjects to a Compare-Contrast console user interface for comparing and contrasting;

whereby said step (5) is performed after step (4).

57. The method of claim 39 further comprising the following step:

(5) providing the context selected in step (1) to a Configure-Filter-Search console user interface to determine further related subjects suitable for related research;

whereby said step (5) is performed after step (4).

58. A computer-based system for conducting research on a multiplicity of research subjects, said system embodied in computer software stored on and accessible from a computer-readable storage medium, said system suitably adapted to enable a user to compare and contrast subject-attribute combinations of a multiplicity of subjects within predefined as well as dynamic contexts, said system comprising:

a subject selection module, suitably adapted to allow a user to provide a first subject to compare and contrast and to provide one or more additional subjects to compare and contrast against the first subject;

a context selection module, suitably adapted to retrieve from a storage medium one or more contexts and to provide such contexts to the user for selection of one or more said contexts;

an attribute selection module, suitably adapted to retrieve from a storage medium one or more attributes associated with the one or more contexts selected by the user;

an attribute association module, suitably adapted to associate the retrieved attributes in combination with the first subject and in combination with the one or more additional subjects;

a comparison-contrast module, suitably adapted to compare the combination of the first subject and the one or more attributes associated therewith against the one or more combinations of the one or more additional subjects and the one or more attributes associated therewith, by searching the subject-attribute combinations within available data sources and by retrieving search results for the subject-attribute combinations; and a display module, suitably adapted to receive input from the user and to display the search results through a Compare-Contrast console user interface.

59. The system of claim 58 wherein said system is internet-based and operates over a communications network.

60. The system of claim 58 wherein the one or more contexts retrieved by the context selection module and provided to the user for selection are retrieved based on their relevance to the first subject.

61. The system of claim 58 wherein the context selection module allows the user to override one or more of the contexts retrieved by the context selection module prior to the user selecting one or more contexts.

62. The system of claim 61 wherein the context selection module allows the user to override one or more of the contexts retrieved by the context selection module by browsing a selection of one or more related contexts.

63. The system of claim 58 wherein the attribute selection module is further suitably adapted to provide one or more attributes to the user for selection of one or more said attributes; and the attribute association module is further suitably adapted to associate said one or more attributes selected by the user in combination with the first subject and in combination with the one or more additional subjects, and to disassociate from the first subject and from the additional subjects the attributes not selected by the user.

64. The system of claim 58 wherein
the subject selection module is further suitably adapted to retrieve from a storage medium one or more related subjects which are related to the first subject, and to provide said one or more related subjects to the user for selection of one or more said related subjects to compare and contrast against the first subject;
the attribute association module is further suitably adapted to associate the one or more attributes retrieved by the attribute selection module in combination with the one or more related subjects selected by the user; and
the comparison-contrast module is further suitably adapted to compare the combination of the first subject and the one or more attributes associated therewith against the one or more combinations of the one or more related subjects and the one or more attributes associated therewith, by searching the subject-attribute combinations within available data sources and by retrieving search results for the subject-attribute combinations.

65. The system of claim 58 wherein
the subject selection module is further suitably adapted to retrieve from a storage medium one or more previously saved search results associated with the one or more contexts selected by the user for the first subject, and to provide said one or more previously saved search results to the user for selection of one or more said previously saved search results to compare and contrast against the first subject; and
the comparison-contrast module is further suitably adapted to compare the combination of the first subject and the one or more attributes associated therewith against the one or more previously saved search results selected by the user, by searching the subject-attribute combinations within available data sources and by retrieving search results for the subject-attribute combinations.

66. The system of claim 58 further comprising a results manipulation module, suitably adapted to manipulate the search results.

67. The system of claim 66 wherein
the results manipulation module is suitably adapted to optimize the search results by use of a similarity/difference index filter, in which the user selects one subject as a baseline and selects a similarity/difference index by which to compare the remaining subjects against the selected subject, and then the similarity/difference index filter compares each of the remaining subjects against the user selected subject to select a subset of the search results associated with each said remaining subject, said subset of search results falling within a similarity/difference range determined by the selected similarity/difference index; and
the display module is further suitably adapted to display said subsets of the search results and not display the search results not included within said subsets.

68. The system of claim 67 wherein the similarity/difference index ranges from −1 to 1, whereby a similarity/difference index of −1 means the compared information should be selected if it is entirely different from the baseline information, a similarity/difference index of 1 means the compared information should be selected if it is exactly the same as the baseline information, a similarity/difference index of between −1 and 1 means the compared information should be selected if it is of a proportional degree of similarity to the baseline information, and a similarity/difference index of 0 means that no filtering should be performed by the similarity/difference index filter.

69. The system of claim 58 wherein the available data sources searched by the compare-contrast module comprise one or more sponsored content repositories associated with the selected one or more contexts.

70. The system of claim 69 wherein the available data sources searched by the compare-contrast module comprise the World Wide Web if relevant information cannot be retrieved from the one or more sponsored content repositories associated with the selected one or more contexts.

71. The system of claim 58 wherein the available data sources searched by the compare-contrast module comprise one or more open content sources associated with the selected one or more contexts.

72. The system of claim 71 wherein the available data sources searched by the compare-contrast module comprise the World Wide Web if relevant information cannot be retrieved from the one or more open content sources associated with the selected one or more contexts.

73. The system of claim 58 wherein the available data sources searched by the compare-contrast module comprises the World Wide Web.

74. The system of claim 58 wherein the display module is further suitably adapted to display the search results in a summarized format by default and to display the search results in a detailed format upon request by the user.

75. The system of claim 58 wherein the subject selection module is further suitably adapted to allow a user to provide at most a pre-defined limited number of additional subjects at one time so that search performance is optimized.

76. The system of claim 58 further comprising a Configure-Filter-Search console interface module, suitably adapted to provide the search results to a Configure-Filter-Search console user interface to determine further related subjects suitable for related research.

77. A computer-based system for conducting research on a multiplicity of research subjects, said system embodied in computer software stored on and accessible from a computer-readable storage medium, said system suitably adapted to enable a user to customize a set of attribute-value configurations associated with a context and then search a multiplicity of subjects related to said attribute-value configurations to arrive at an appropriate subset of relevant subjects for further research, said system comprising:
a context selection module, suitably adapted to allow a user to select a context having associated therewith one or more attributes;
a configure-filter-search module, suitably adapted to retrieve from a data source one or more subjects having at least the one or more attributes associated with the selected context, and to retrieve from the data source for each retrieved subject one or more values associated with said one or more attributes; and
a display module, suitably adapted to receive input from the user and to display the one or more retrieved subjects, and for each said subject displaying the retrieved values associated therewith, through a Configure-Filter-Search console user interface.

78. The system of claim 77 wherein said system is internet-based and operates over a communications network.

79. The system of claim 77 wherein the context selection module allows the user to browse a selection of one or more contexts from which to select a context.

80. The system of claim 79 wherein the context selection module allows the user to browse a selection of multiple contexts related to each other in a multiply linked configuration from which to select a context.

81. The system of claim 79 wherein the context selection module allows the user to browse a selection of multiple contexts related to each other hierarchically from which to select a context.

82. The system of claim 77 wherein the data source of the configure-filter-search module is one or more sponsored content repositories.

83. The system of claim 82 wherein the data source of the configure-filter-search module is the World Wide Web if relevant information cannot be retrieved from the one or more sponsored content repositories.

84. The system of claim 77 wherein the data source of the configure-filter-search module is a collection of one or more selected open content sources.

85. The system of claim 84 wherein the data source of the configure-filter-search module is the World Wide Web if relevant information cannot be retrieved from the one or more open content sources.

86. The system of claim 77 wherein the data source of the configure-filter-search module is the World Wide Web.

87. The system of claim 77 wherein the display module is suitably adapted to display the retrieved values as a summary of values through the Configure-Filter-Search console user interface.

88. The system of claim 87 further comprising
a user manipulation module, suitably adapted to allow the user to select one or more desired values from the summary of values displayed by the display module;
wherein the configure-filter-search module is further suitably adapted to retrieve from the data source one or more subjects having associated therewith the one or more values selected by the user in the user manipulation module.

89. The system of claim 88 wherein the user manipulation module is further suitably adapted to allow the user to selects one or more desired values by selecting a highest allowable value and a lowest allowable value, with said one or more desired values being those values falling between said highest allowable value and said lowest allowable value, inclusive.

90. The system of claim 77 further comprising a Compare-Contrast console interface module, suitably adapted to provide one or more of the retrieved subjects to a Compare-Contrast console user interface to compare and contrast said subjects.

91. A computer-based system for conducting research on a multiplicity of research subjects, said system embodied in computer software stored on and accessible from a computer-readable storage medium, said system suitably adapted to enable a user to customize contexts and subject-attribute combinations and then search a multiplicity of subjects related to said context and subject-attribute combinations to arrive at relevant values for research, said system comprising:
a context selection module, suitably adapted to allow a user to select a context having associated therewith one or more attributes;
a subject selection module, suitably adapted to allow a user to provide one or more subjects to research;
an attribute selection module, suitably adapted to allow a user to provide one or more attributes to research;
a search module, suitably adapted to retrieve from a data source one or more values associated with each subject-attribute combination provided by the user within the user selected context; and
a display module, suitably adapted to receive input from the user and to display the one or more retrieved values through a Custom-Research console user interface.

92. The system of claim 91 wherein said system is internet-based and operates over a communications network.

93. The system of claim 91 further comprising a context learning module, suitably adapted to modify the user selected context by associating therewith one or more additional attributes provided by the user if, for each said additional attribute, any value was retrieved for said additional attribute in combination with the one or more subjects provided by the user by the search module.

94. The system of claim 91 wherein the context selection module allows the user to browse a selection of one or more contexts from which to select a context.

95. The system of claim 94 wherein the context selection module allows the user to browse a selection of multiple contexts related to each other in a multiply linked configuration from which to select a context.

96. The system of claim 94 wherein the context selection module allows the user to browse a selection of multiple contexts related to each other hierarchically from which to select a context.

97. The system of claim 91 wherein the context selection module allows the user to override the one or more contexts retrieved from the storage medium by direct input of a context.

98. The system of claim 91 wherein
the subject selection module limits the user to providing at most a pre-defined limited number of subjects so that search performance is optimized; and
the attribute selection module limits the user to providing at most a pre-defined limited number of attributes so that search performance is optimized.

99. The system of claim 91 wherein the data source of the search module is one or more sponsored content repositories.

100. The system of claim 99 wherein the data source of the search module is the World Wide Web if relevant information cannot be retrieved from the one or more sponsored content repositories.

101. The system of claim 91 wherein the data source of the search module is a collection of one or more selected open content sources.

102. The system of claim 101 wherein the data source of the search module is the World Wide Web if relevant information cannot be retrieved from the one or more open content sources.

103. The system of claim 91 wherein the data source of the search module is the World Wide Web.

104. The system of claim 91 wherein
the search module is suitably adapted to prioritize the retrieved values by relevance; and
the display module is suitably adapted to display for each subject-attribute combination only the value having the highest relevance to said subject-attribute combination.

105. The system of claim 91 wherein the values retrieved by the search module are links to web pages.

106. The system of claim 91 wherein the display module is further suitably adapted to permit the user to edit one or more of the one or more displayed values.

107. The system of claim 91 further comprising a Compare-Contrast console interface module, suitably adapted to permit the user to select one or more subjects for comparison and contrasting and to provide the one or more selected subjects to a Compare-Contrast console user interface to compare and contrast said subjects.

108. The system of claim 91 further comprising a Configure-Filter-Search console interface module, suitably adapted to provide the context selected by the user through the context selection module to a Configure-Filter-Search console user interface to determine further related subjects suitable for related research.

109. A computer-based system for conducting research on a multiplicity of research subjects, said system embodied in computer software stored on and accessible from a computer-readable storage medium, said system suitably adapted to provide for a Universal Research Framework to be embedded within any externally managed information system, comprising:
- a system integration module, suitably adapted to integrate a first system, a second system, and a third system; and
- a system interface module, suitably adapted to integrate the information system with the system integration module;

wherein said first system comprises:
- a subject selection module, suitably adapted to allow a user to provide a first subject to compare and contrast and to provide one or more additional subjects to compare and contrast against the first subject;
- a context selection module, suitably adapted to retrieve from a storage medium one or more contexts and to provide such contexts to the user for selection of one or more said contexts;
- an attribute selection module, suitably adapted to retrieve from a storage medium one or more attributes associated with the one or more contexts selected by the user;
- an attribute association module, suitably adapted to associate the retrieved attributes in combination with the first subject and in combination with the one or more additional subjects;
- a comparison-contrast module, suitably adapted to compare the combination of the first subject and the one or more attributes associated therewith against the one or more combinations of the one or more additional subjects and the one or more attributes associated therewith, by searching the subject-attribute combinations within available data sources and by retrieving search results for the subject-attribute combinations; and
- a display module, suitably adapted to receive input from the user and to display the search results through a Compare-Contrast console user interface;

said second system comprises:
- a context selection module, suitably adapted to allow a user to select a context having associated therewith one or more attributes;
- a configure-filter-search module, suitably adapted to retrieve from a data source one or more subjects having at least the one or more attributes associated with the selected context, and to retrieve from the data source for each retrieved subject one or more values associated with said one or more attributes; and
- a display module, suitably adapted to receive input from the user and to display the one or more retrieved subjects, and for each said subject displaying the retrieved values associated therewith, through a Configure-Filter-Search console user interface; and said third system comprises:
- a context selection module, suitably adapted to allow a user to select a context having associated therewith one or more attributes;
- a subject selection module, suitably adapted to allow a user to provide one or more subjects to research;
- an attribute selection module, suitably adapted to allow a user to provide one or more attributes to research;
- a search module, suitably adapted to retrieve from a data source one or more values associated with each subject-attribute combination provided by the user within the user selected context; and
- a display module, suitably adapted to receive input from the user and to display the one or more retrieved values through a Custom-Research console user interface.

* * * * *